United States Patent [19]

Engelstein et al.

[11] 3,729,094

[45] Apr. 24, 1973

[54] RANDOM-ACCESS CARD FILE SYSTEM

[75] Inventors: Stanley Engelstein, New York; Isidore Dorman, Whitestone, both of N.Y.

[73] Assignee: Bell & Howell Company, Chicago, Ill.

[22] Filed: Feb. 24, 1971

[21] Appl. No.: 118,455

[52] U.S. Cl. ....... 209/80.5, 209/110.5

[51] Int. Cl. ....... B07c 5/34

[58] Field of Search ....... 209/80.5, 110.5

[56] References Cited

UNITED STATES PATENTS 3,524,545 8/1970 Doundoulakis et al. ....... 209/80.5

*Primary Examiner*—Richard A. Schacher
*Assistant Examiner*—Gene A. Church
*Attorney*—Michael Ebert

[57] ABSTRACT

A random-access card file system formed by cartridges for storing the cards and a card file selector adapted to cooperate with the cartridges to extract any desired card therefrom, regardless of its position therein. Each cartridge is capable of accommodating a deck of cards, each of which includes an upstanding tab whose longitudinal position with reference to a selector scale extending the full length of the deck is determined by its master index identification. The selector is provided with a carriage movable along a linear track to any desired incremental point on the scale, the carriage supporting a tab-engaging member or picker, whereby when the selector is placed over the cartridge, the picker engages and grips any tab in registration therewith, and when the selector is thereafter lifted, the tab-held card is extracted from the deck.

11 Claims, 11 Drawing Figures

INVENTORS
STANLEY ENGELSTEIN
ISIDORE DORMAN
BY Richard Ebergh
ATTORNEY

INVENTORS
STANLEY ENGELSTEIN
ISIDORE DORMAN
BY
ATTORNEY

INVENTORS
STANLEY ENGELSTEIN
ISIDORE DORMAN
Michael Ebert
ATTORNEY

RANDOM-ACCESS CARD FILE SYSTEM

BACKGROUND OF THE INVENTION

The present invention relates generally to retrieval systems for randomly-stored file cards, and more particularly to a card-file cartridge and card-selector combination making it possible to extract any desired card from the cartridge regardless of its position therein.

The term "card" as used herein is intended generally to cover any type of filing element which may be stacked in boxes or in any other form of file receptacle, and it includes ordinary single-sheet file or tabulating cards, aperture cards in which a microfilm slide is mounted within a card aperture, multiple-channel microfilm jackets and microfiche jackets of the type disclosed in Engelstein U.S. Pat. No. 3,238,655. The term "card" is therefore intended to encompass any existing form of filing element formed by one or more sheets of paper, cardboard or plastic material or combinations thereof.

In the traditional, ordered card-filing system, the stacked cards are serially arranged in alphabetical, numerial or other order in accordance with an established classification system. When, in a system of the ordered type, a clerk wishes to consult a particular card, he goes to the appropriate file box or drawer and then proceeds to search for that card. If, for example, the card bears the identification number 126 and should be found in a file box intended for cards 100 to 199, the clerk riffles through the cards in that box until he locates card 126. After use, to avoid misfiling, the clerk must be careful to return card 126 to its correct position in the proper file box.

Thus, in a conventional, ordered file system, a significant amount of clerical time is consumed not only in searching for and finding a given card, but also in returning the card to its orderly position. Should the card be misfiled as a result of clerical error, the search to locate the misfiled card takes up even more time.

In order to effect economies in clerical operations, data-retrieval systems have been developed adapted to extract a desired card from a stack or deck of randomly-stored cards. In existing data-retrieval systems, the system is arranged to quickly and accurately select, from a large number of cards lying in face-to-face contact in a file, a particular card corresponding to a code marking or other form of identification in a master file index. The cards in the file may be in any random order and, after being extracted from the file for inspection, reproduction or other use, the card may be returned to any position within the file and subsequent retrieved without difficulty.

In most random-access retrieval systems of the type in current use, the cards are formed with a series of edge notches and apertures which are sensed by sorting rods. Thus, in the well-known McBee Key Sort Card Selection System, each card, at its lower edge, is provided with a series of equally-spaced apertures arranged in a row, which apertures define adjacent code locations or notch sites that are adapted to be selectively provided with one or more notches to facilitate, in cooperation with sorting rods, selection of a desired card from a deck of stored cards.

The Mosler retrieval system described in U.S. Pat. No. 3,536,194 is similar to the McBee system save that in Mosler, sorting rods act to leave the desired card available for selection and removal, whereas in McBee, the sorting rods positively engage the desired card for selection and extraction from the deck.

The Mosler and McBee systems, as well as other commercially-available random-access systems involving edge-notch cards, are relatively elaborate and expensive. Such systems, in addition to involving complex sorting-rod mechanisms, also require fairly complicated devices to impress the necessary code notches or apertures on each card. Consequently, the cost of existing random-access file systems is quite high, and in some instances prohibitive, so that the file user may be compelled by economic considerations to install a non-random ordered file system despite its inherent drawbacks.

But apart from the complexity and high cost of installing and operating commercially-available types of random-access systems, they make the transition from a traditional to a random-access system difficult and expensive. The reason for this is that the clerical staff has to be retrained to operate the keyboard or whatever other controls are incorporated in the new system, for an altogether different set of clerical skills is involved and must be acquired before the new system is put into operation.

Where clerical personnel have developed facility in operating a traditional filing system with reasonable efficiency, this facility is sacrificed in converting to an existing type of random-access system and the personnel must be taught new skills. Also, because sophisticated random-access systems generally entail maintenance and servicing, and the technical requirements for this purpose are lacking in clerical personnel, should the system become defective or break down, it may remain out of order until a qualified maintenance engineer is available.

SUMMARY OF THE INVENTION

In view of the foregoing, it is the primary object of this invention to provide an easily operated random-access system formed by cartridges for storing file cards, which cartridges cooperate with a common card file selector making it possible to extract any desired card from a cartridge regardless of its position therein.

Among the significant features of the invention are its exceptional simplicity and reliability, for the system lends itself to use with cards devoid of notches or apertures, and merely entails that each card have an upstanding tab at a position determined by its master index number. Since all that is required on each card is a single tab, the possibility of error in coding the card is considerably reduced.

More specifically, it is an object of this invention to provide a system of the above type, in which the selector may be manually or automatically set to pick out a desired card and, when seated on the cartridge, acts to engage only the tab of the desired card, whereby when the selector is thereafter lifted from the cartridge, the tab-engaged card is withdrawn from the cartridge deck, all other cards remaining in place.

Also an object of this invention is to provide a random-access file-card cartridge and selector combination which may be manufactured and sold at relatively low cost.

A major advantage of a random-access system in accordance with the invention is that it is operationally compatible with traditional filing techniques so that clerical personnel experienced in the operation of the traditional system can be taught to operate the new system in a matter of minutes, without any special retraining. Moreover, with this random-access system, it is not necessary to abandon existing file cabinets and storage facilities employed in the traditional system, for these may readily be adapted to the new system which makes use of file-card cartridges that may be stored in existing facilities.

Briefly stated, these objects are attained in a system wherein the cards to be filed are contained in a group of identical cartridges, each capable of housing a predetermined deck of cards in fact-to-face contact. Each card in the deck is provided with an upstanding tab whose longitudinal position with respect to a scale extending the full length of the deck is determined by its master index number.

Cooperating with the cartridges is a removable selector including a linear track having a scale thereon and a carriage settable along the track to any desired incremental point on the scale. Supported on the carriage and projecting therebelow is a tab-engaging element or picker which is adapted to grip any tab in the deck whose position corresponds to the carriage setting regardless of the transverse position of the tab within the deck. When the selector is seated on the cartridge, any tab which lies in longitudinal registration with the selected scale point is frictionally engaged and gripped by the picker, and when the selector is thereafter lifted from the cartridge, the selected card is removed by its tab from the deck.

OUTLINE OF THE DRAWING

For a better understanding of the invention as well as other objects and further features thereof, reference is made to the following detailed description to be read in conjunction with the accompanying drawing, wherein.

DESCRIPTION OF THE INVENTION

Figures 1, 9, 11:
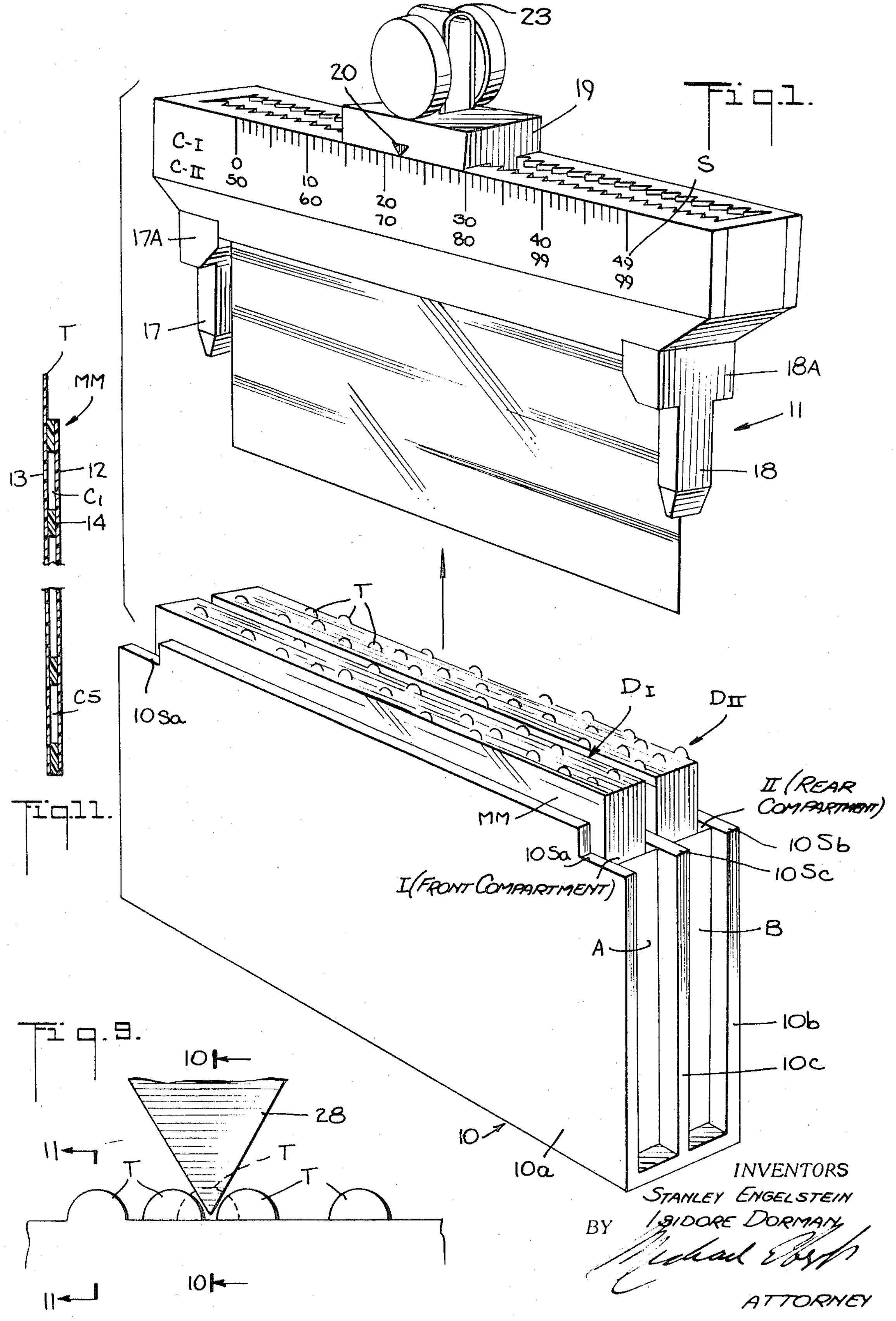
FIG. 1 is a perspective view of a random-access filing system in accordance with the invention, in which file cards are stored in a cartridge and are extracted therefrom by a selector mechanism.
FIG. 9 shows the relationship of the selector comb to the cards in the cartridge.
FIG. 11 is a section taken through one of the cards.
Figure 3:
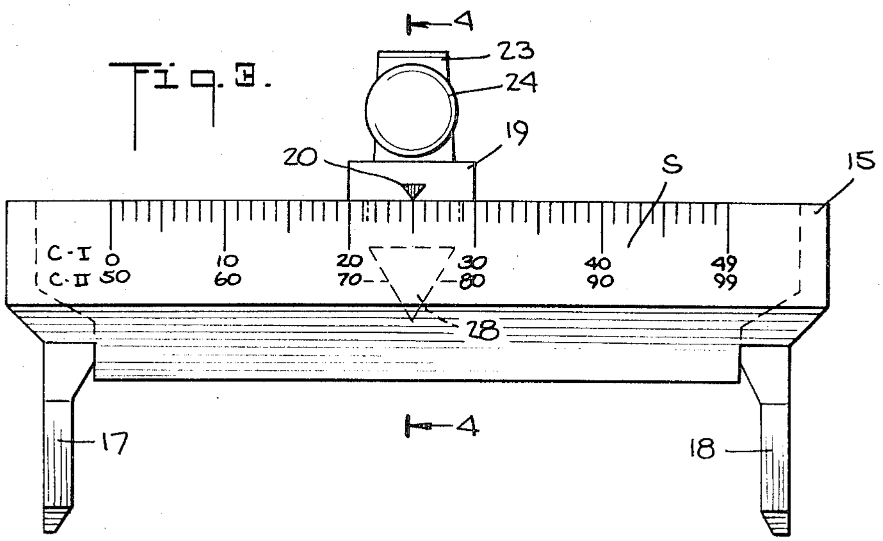
FIG. 3 is a front view of the selector mechanism.
Figure 2:
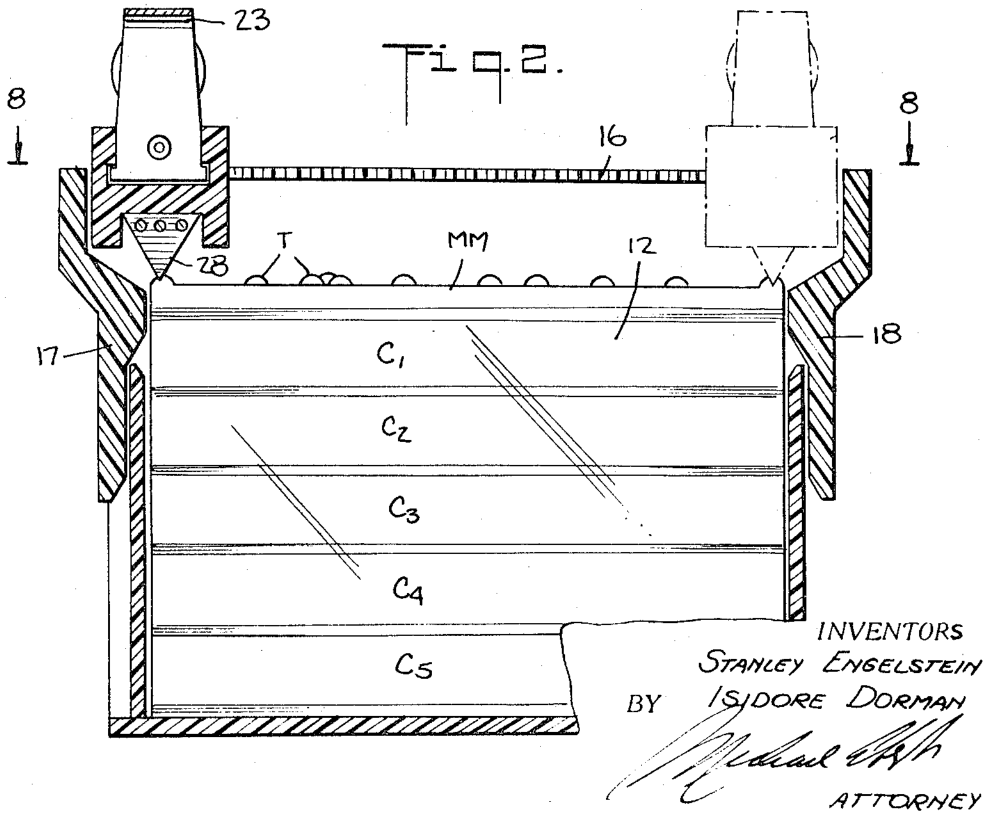
FIG. 2 is a longitudinal section taken in the vertical plane through the cartridge and selector mechanism combination.

Referring now to the drawing, and more particularly to FIGS. 1 and 2, there is shown a cartridge and selector combination in accordance with the invention, the former being generally designated by numeral 10, and the latter by numeral 11. In practice, the filing system may be constituted by a large assembly of cartridges and a single selector to extract cards from any cartridge in the assembly.

To give a simple example, if the system is intended for the storage of, say, a maximum of 10,000 file cards, one may provide one hundred cartridges, each capable of accommodating 100 cards. Obviously there may be fewer than 100 cards in any cartridge. These cartridges may be placed in a compartmentalized cabinet for ready access, or the cartridges may be arranged on a rotary turret or turntable, or in a Ferris-wheel type of storage device adapted to be indexed to present a selected cartridge to the user. As pointed out previously, existing filing facilities for a non-random system may be used to house the cartridges for the random-access system.

For purposes of illustrating the invention, we shall stay with the example given above and now consider a cartridge 10 designed to accommodate one hundred cards of the microfiche jacket type disclosed in the above-identified Engelstein patent, modified to function in the random-access system. Again, it is noted that the invention is usable with any form of card, but regardless of the type of card employed, it must be provided with tabs as hereinafter described.

Cartridge 10 is an open-top, box-like structure, preferably made of high-strength plastic material, including front and rear walls **10*a* and 10*b*, and an intermediate wall 10c partitioning the interior into front and rear compartments I and II of equal size. Each compartment is capable of storing a deck of fifty cards. Walls 10*a*, 10*b* and 10*c* extend beyond the end walls of the cartridge to create left and right vertical guide channels A and B on both ends of the cartridge. The upper corners of walls 10*a*, 10*b* and 10*c* are notched to create shoulders 10S*a*, 10S*b* and 10S*c*** on the right and left sides of the cartridge.

The microfiche jacket cards MM, as best seen in FIGS. 2 and 11, are each constituted by two transparent rectangular panels 12 and 13 in superposed relation, the panels being formed of clear, flexible plastic material, such as cellulose acetate, polyester film, Mylar, or any other suitable transparent sheeting having high tensile strength. Interposed between these panels and bonded thereto are spacer ribs formed by longitudinally-extending strips 14 in parallel relation to define parallel channels $C_1$ to $C_5$ open at either end. The channels are of like width to accommodate microfilm strips of a given size, such as 16 mm. or 35 mm. film.

As shown in FIG. 1, a deck $D_I$ of 50 cards MM is stored in compartment I of cartridge 10, and a like deck $D_{II}$ is stored in compartment II. The cards in each deck are provided with upstanding tabs T. Where the cards are micro-fiche jackets, these tabs may be fabricated by extending the rear panel 13 of the microfiche jacket above the uppermost rib 14 and die-cutting the extension to define the rounded tab profile. Since with a microfiche jacket of the Engelstein type, the rear panel is formed of a relatively heavy plastic sheet, the resultant tab is stiff and durable. Alternatively the tabs need not be integral with the card but may be separately formed and bonded to the cards at appropriate positions.

With two decks of fifty cards each contained in every compartmentalized cartridge, for indexing purposes the one hundred cartridges for a file system of 10,000 cards may be identified in a master index by cartridge numbers 1 to 100, and the cards in deck I by card numbers 0 to 49, and those in deck II by card numbers 50 to 100.

In order to facilitate selection, tabs T of the cards in each of decks $D_I$ and $D_{II}$ are positioned to occupy particular longitudinal positions with reference to the dual scale S imprinted or otherwise formed along the front side of selector 11 and extending the full length of the deck. The upper section 0 of the dual scale S is graduated from O to 49; hence the tabs T formed on the front deck of cards are displaced from each other to occupy positions in longitudinal alignment with the incremental points on this scale.

The lower portion C-II of scale S is graduated from 50 to 99, the increments of which correspond to the increments 0 to 49 on the upper section C-I of the scale. Tabs T formed on the rear deck of cards are also displaced from each other to occupy positions in longitudinal alignment with the incremental points on the related scale.

Since the scale is the same for both decks, the series of tab positions thereon is the same, the distinction residing in whether the deck is placed in the front or rear compartment of the cartridge. It will be appreciated that the number of tabs one may place on a deck of cards depends on the length of the deck and the size of the tabs, as well as the ability of the selector to discriminate between displaced tabs.

While in the system described above a distinct tab position is assigned to each card, one may have two or more cards in a deck with the same tab position, as in those situations where data related to a particular subject cannot be contained on a single card.

In the master index for a system as described above, the cards are identified by cartridge, compartment, and tab position. Thus a card identified in the master index as 93-II-27 is to be found in cartridge 93, rear compartment II thereof, and tab position 27. However, while this card belongs in the rear compartment of cartridge 93, it may be placed at any position in this compartment, for the selector is adapted to pick up this card regardless of its position in the deck.

In practice, as shown in FIG. 9, it is possible to place the tabs, which have a rounded formation, fairly close to one another so that they overlap, as long as the displacement is sufficient for the selector comb (to be later described) to pick a desired tab without engaging an undesired tab. Moreover, since the cards in each deck do not appear in numerical order in the cartridge compartment, but are placed at random therein, even though the cards, had they been stacked in sequential order, would have overlapping tabs, when randomly placed in face-to-face contact, the cards for the most part have their tabs well separated from each other. Of course, the tabs need not be rounded but may have any formation facilitating their selection by a picker element.

Selector 11, as best seen in FIGS. 3 to 8, is constituted by an open track formed by a pair of linear strips 15 and 16 which are held in spaced parallel relation by a pair of leg members 17 and 18 secured to the ends of the strips and projecting downwardly therefrom. The leg members 17 and 18 are dimensioned to be received in channel A or B of the cartridge which guide and locate the selector thereon.

Figures 4, 5, 6, 7, 10:
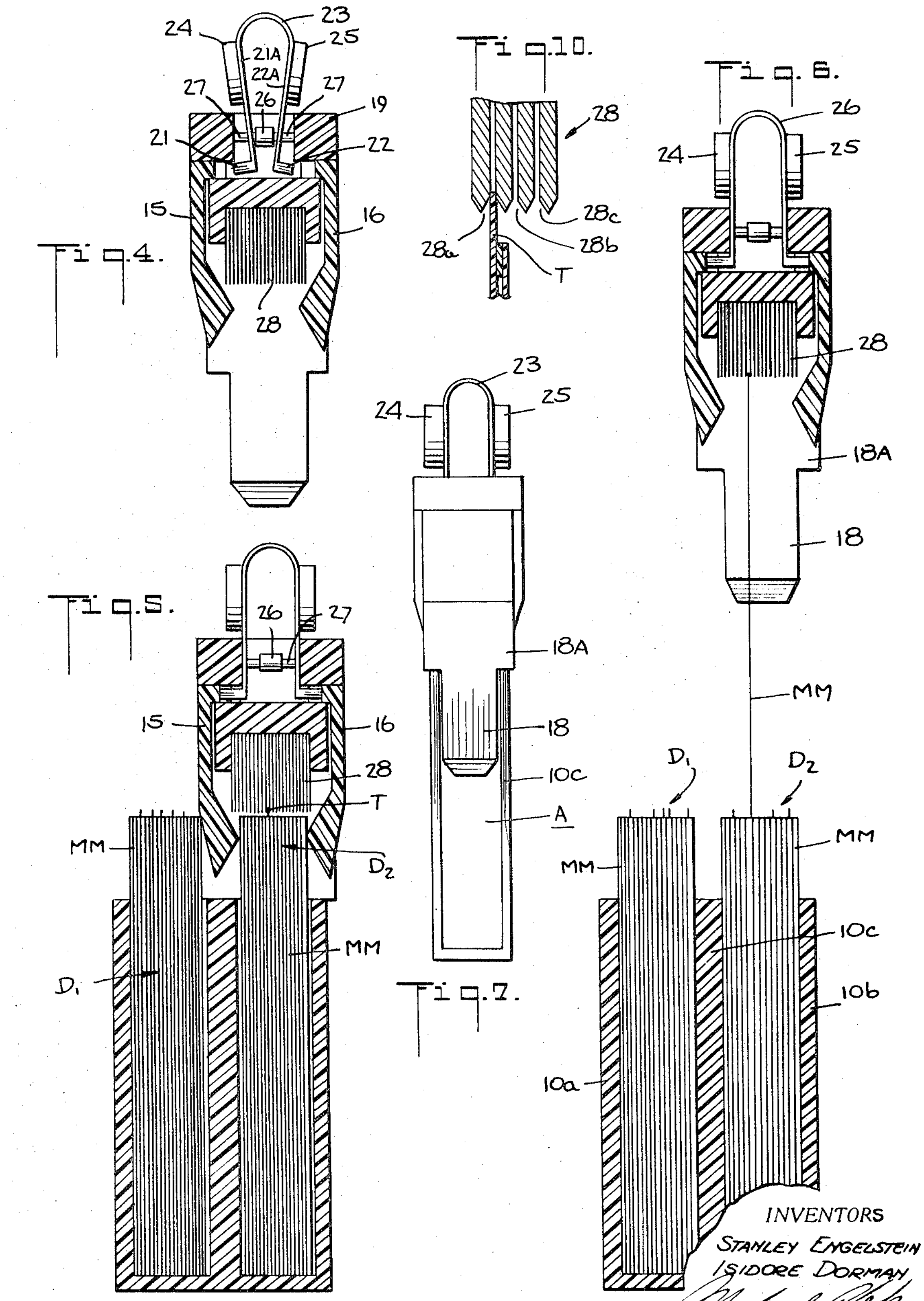
FIG. 4 is a transverse section taken in the plane of the selector mechanism indicated by line 4—4 in FIG. 3.
FIG. 5 is a transverse view of the cartridge and selector mechanism combination, with the selector shown in engagement with a selected card.
FIG. 6 is the same as FIG. 5, except that it shows the selector mechanism raised above the cartridge to pull out the selected card.
FIG. 7 is an end view of the cartridge and selector mechanism combination.
FIG. 10 is a transverse section taken in the plane indicated by line 10—10 in FIG. 9.

The leg members are provided with bolsters 17A and 18A that bridge shoulders 10Sa and 10Sc of the cartridge walls or shoulders 10Sc and 10Sb, depending on whether the selector is placed over front deck $D_I$ or rear deck $D_{II}$ in the cartridge. When the selector is in place, the upper portion of the cards in the deck then lies within the opening between strips 15 and 16 of the selector track, as shown in FIG. 5.

Figure 8:
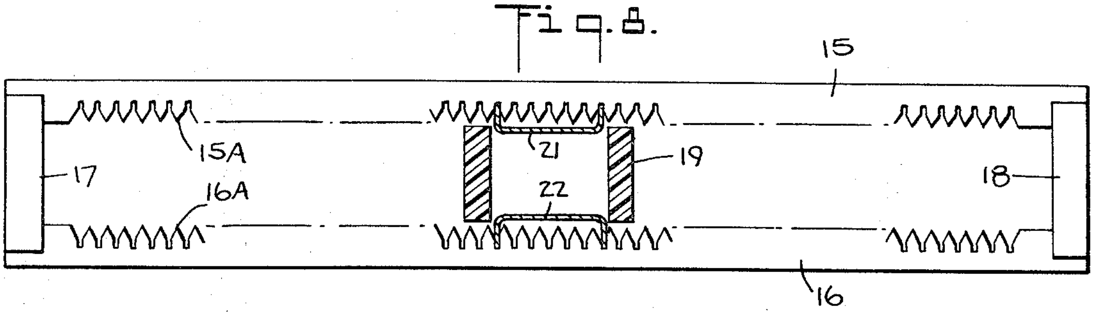
FIG. 8 is a longitudinal section taken in the horizontal plane indicated by line 8—8 in FIG. 2.

Shiftable along the track of the selector is a carriage 19 having a pointer 20 which travels along the indicia C-I and C-II of scale S to indicate the carriage setting. As best seen in FIG. 8, the inner surfaces of strips 15 and 16 of the track are provided with serrations 15A and 16A to form straight racks.

The teeth of the racks are engageable by detents 21 and 22 formed at the ends of a pair of tines 21A and 22A defined by a U-shaped flat spring 23. Tines 21A and 22A have finger-buttons 24 and 25 attached thereto, making it possible for an operator to compress the tines toward abutment 26 formed midway on an axle 27 passing through bores in the tines, the end of the axle being anchored in carriage 19.

When the tines are squeezed, detents 21 and 22 are disengaged from the rack teeth so that the operator is then free to slide the carriage along the track to any desired scale setting, at which point the tines are released, causing the detents to fall into place to lock the carriage setting.

Mounted in the carriage and projecting therebelow is a multi-toothed comb 28 which, as best seen in FIG. 10, is formed by a stack of identical triangular plates equispaced by shims that are dimensioned to expose the tips of the plates. These tips are chamfered to define a serial row of jaw-like indentations *28a*, *28b*, *28c*, etc., which extend transversely relative to the deck of cards therebelow for the full width of the compartment. The axis of the indentations is aligned with pointer 20 on the carriage; hence the operative comb position is determined by the scale setting of the carriage.

Since each card has a tab T whose position is registered with one incremental point on dual scale S, and comb 28 is shiftable to occupy any desired scale setting, the tab at that point will be frictionally engaged by a jaw-like indentation and gripped thereby, as shown in FIGS. 5 and 10, when selector 11 is brought down and seated on the cartridge. When the selector is thereafter lifted, as shown in FIG. 6, the tab-gripped card MM will be carried therewith and thereby extracted from the deck, all other cards remaining in place.

The tab-engaging member need not be in the comb-like form shown, and may take other forms adapted to grip a tab lying in registration with the selector setting. Thus the tab-engaging member may be constituted by a helical compression spring serving to engage tabs in the row of spaces between adjacent convolutions. These convolutions need not be circular but may be somewhat triangular or otherwise shaped to provide better discrimination between displaced tabs. Or instead of a comb formed by plates which are securely held together as shown herein, these plates may be loosely supported on a common supporting rod to facilitate the entry of a tab between adjacent plates, retractable clamping means being provided to thereafter compress the plates in order to grip an engaged tab.

Thus the clerk who wishes to extract a particular card from a file system of 10,000 cards, first consults the master index to find the code number of the card. For example, if the clerk in an insurance company wishes to consult the record of John Smith of Albany, New York, the clerk first checks the master index for New York State where he finds that John Smith of Albany has a record on a card identified as 90-II-58. The clerk then goes to the cartridge marked No. 90 and picks up the selector and adjusts its carriage to scale point 58. The clerk then places the selector over compartment II of cartridge No. 90 to engage card number 58 therein, and he withdraws the selector to extract the desired card. After use, the card is returned to compartment II of cartridge No. 90 at any position therein.

It will be seen therefore that a file clerk using a system in accordance with the invention carries out the same basic procedure involved in a traditional system, which is to go to the file box or cartridge containing the desired card. But instead of then searching for the card, the clerk uses the selector for this purpose. After use, the clerk returns the card to the cartridge, but the clerk need not place the card in a particular alphabetical or numerical position therein, but merely returns the card to any position within the proper compartment. Thus the present invention is compatible with existing filing techniques and yet effects major economies in the time involved in clerical operations.

Though the system has been described in its simplest embodiment in which selection is carried out manually, it will be appreciated that the arrangement may be readily automated using available technology. For this purpose, the system may be provided with a keyboard whereby an operator has merely to press suitable switching keys to obtain a desired card.

If, for example, there is a call for card 85-I-20, the operator presses a cartridge key 85 on the keyboard, causing a turret or other motorized storage device to index until it presents cartridge No. 85 to a selector station. By pressing compartment key I and selector key 20, the selector at the station is automatically set to scale position 20 and is brought down on compartment I of cartridge No. 85 to engage card number 20 therein, after which the selector is raised to extract the selected card.

While there has been shown and described a preferred embodiment of random-access card-file system in accordance with the invention, it will be appreciated that many changes and modifications may be made therein without, however, departing from the essential spirit thereof.

We claim:

1. A random-access filing system for cards identified in a master index, comprising:

A. a selector having a linear track and a carriage movable along said track and settable to any desired incremental point on a longitudinally-extending scale related to said track, said carriage having a tab-engaging member adapted to physically grip any tab whose position lies in longitudinal registration with the carriage setting without regard to the transverse position of the tab in a deck of cards provided with tabs, and B. a cartridge for housing at least one deck of cards, the cards in the deck each having an upstanding tab whose longitudinal position with respect to said scale is determined by the master index identification of the card, said tab-engaging member being movable toward and away from said deck, whereby when said member is brought down on the deck, the only tabs which are engaged are those which lie in registration with the carriage setting, and when said member is lifted from the deck, the tab-engaged cards are fully extracted from the deck.

2. A system as set forth in claim 1, wherein said cartridge is divided into two like compartments, each accommodating a deck of cards, and wherein said selector is provided with a dual scale to effect settings for the respective compartments.

3. A system as set forth in claim 1, wherein said cards are constituted by microfilm jackets having said tabs thereon.

4. A system as set forth in claim 3, wherein said jackets are constituted by transparent front and rear panels of flexible sheeting separated by spacers to define channels for receiving microfilm inserts, the rear panel being relatively heavy and having an upper marginal extension profiled to define said tab.

5. A system as defined in claim 1, wherein said cards are constituted by aperture cards having said tabs thereon.

6. A system as set forth in claim 1, wherein said selector includes a pair of legs projecting downwardly from the ends of the track, and said cartridge is provided with guide channels at the ends thereof to receive said legs and thereby locate said selector on said cartridge.

7. A system as set forth in claim 1, wherein said tab-engaging member of said carriage is constituted by a comb having a serial row of jaw-like indentations extending transversely with respect to the deck of cards, whereby said comb engages only that tab which lies in registration with said carriage.

8. A system as set forth in claim 7, wherein said comb is constituted by a stack of triangular plates which are equi-spaced by shims dimensioned to expose the tips of the plates and thereby create said indentations.

9. A system as set forth in claim 1, wherein said track has a rack formation and said carriage is provided with a retractable detent to engage teeth on said rack to maintain the carriage at a desired setting.

10. A cartridge adapted to cooperate with a card selector in a random-access filing system, said cartridge comprising an upon-top box having front and rear walls and an intermediate wall dividing the cartridge into two like compartments for receiving two decks of file cards, said walls extending beyond the ends of the box to create guide channels at both ends for receiving locating legs projecting from the selector.

11. A selector for extracting cards from a file cartridge, which cards are provided with upstanding tabs, said selector comprising a carriage movable along a linear track to a selected point thereon corresponding to a tab position of a desired card, and a picker element coupled to said selector frictionally to engage said tab, said element being constituted by a comb having a series of spaced plates, the space between any two adjacent plates being adapted to receive a tab in alignment therewith.

* * * * *